Dec. 10, 1940.  G. B. FINNEGAN, JR., ET AL  2,224,726
PHOTOGRAPHIC CAMERA
Filed Aug. 25, 1938
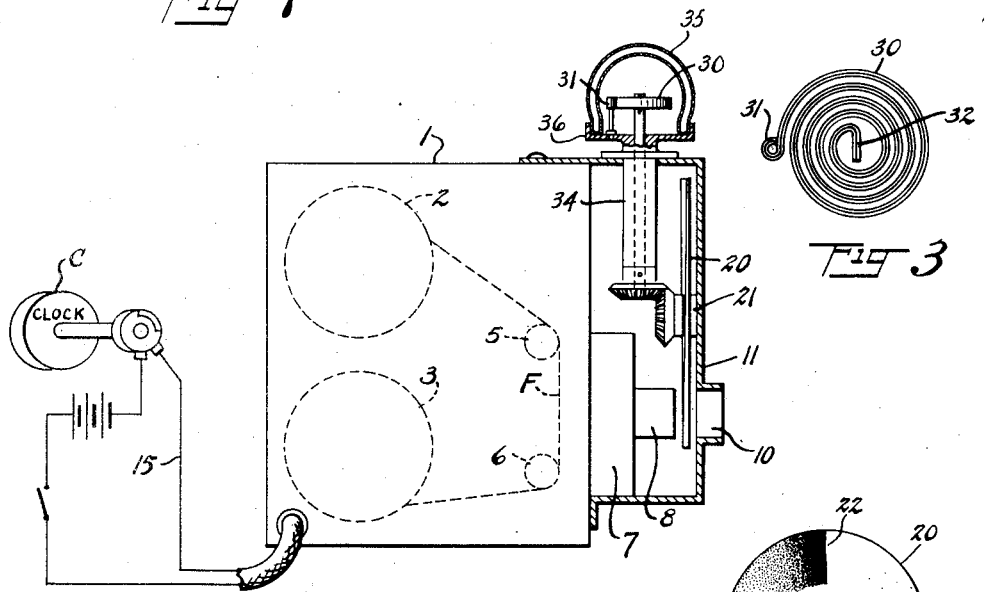
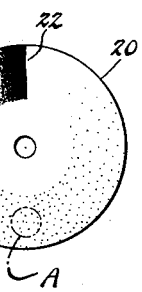
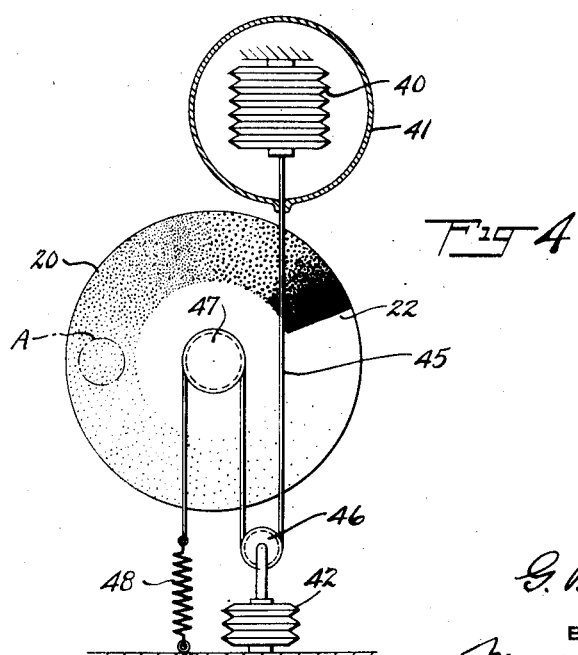
INVENTORS
G. B. Finnegan Jr.
G. D. Creedman
BY
Morgan, Finnegan & Durham
ATTORNEYS Patented Dec. 10, 1940

2,224,726

UNITED STATES PATENT OFFICE 2,224,726

PHOTOGRAPHIC CAMERA

George B. Finnegan, Jr., and George D. Creelman, Mountain Lakes, N. J.; said Creelman assignor to said Finnegan, Jr., and Hobart N. Durham, Munsey Park, Long Island, N. Y., a partnership Application August 25, 1938, Serial No. 226,742

5 Claims. (Cl. 95—64)

The present invention relates to a novel and improved photographic camera, and more particularly to an improved camera having novel means for regulating and controlling the exposure of the film to light, and to a novel method of regulating such exposure.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention and, together with the description, serves to explain the principles of the invention.

Of the drawing:

Fig. 1 is a vertical, longitudinal section of a camera embodying the invention;

Fig. 2 is a detail in elevtion of a light-density controlling filter;

Fig. 3 is a detail in plan of a thermo-expansive coil; and

Fig. 4 is a transverse section of a modified form of filter control.

The present invention has for its object the provision of a novel and improved photographic camera in which the exposure is automatically regulated so that the photosensitive plate or film always receives substantially the correct amount of light. A further object is the provision of improved means for regulating the amount of light received by the photosensitive element through the camera lens. The invention also provides an improved method of varying the amount of light passing through the lens by regulating one of the exposure factors in accordance with the radiant heat falling on the object to be photographed. Still another object is the provision of an improved camera in which the exposure is varied by means energized by the radiant heat falling on or near the object to be photographed.

We have discovered that the amount of sun light illuminating an object to be photographed is closely proportional to the radiant heat which can be absorbed by a black body illuminated by the radiant energy from the sun, and that as the light intensity changes so does the radiant heat change. This is not only true of the average heat and average light over a period of months, but is also true from moment to moment, and such variations as there are can be more than compensated for by the latitude of the present day photosensitive materials generally available. The principal errors which arise are caused by the heat capacity of the parts which does not allow them to respond as rapidly as the changes in radiant energy occur. An even closer correspondence is found between the light and radiant heat if a correction is made in the radiant heat factor so as to take into account the ordinary temperature of the air.

In accordance with the present invention, which is particularly useful in connection with recording cameras which must operate periodically for long periods of time without attention to the varying exposure requirements, the amount of light received by the photosensitive element in exposure position is regulated by the radiant heat falling on or near the object to be photographed, and this radiant heat is converted into a mechanical movement so as to vary one of the exposure factors, such as lens aperture, filter density or exposure time. As embodied, there is provided a black body which is exposed to the sunlight and contains a thermally responsive element which is connected so as to vary the exposure factors in such a manner that the light received by the photosensitive elements remains substantially constant. In one form, the black body includes a thermomotive element which is geared to a variable density neutral filter interposed in the path of the rays forming the light image, so that the more intense the radiant heat absorbed by the black body, the more opaque will be the portion of the neutral filter which is positioned to modify the light rays.

The invention is especially applicable to control of camera shutters on cameras being used to photograph road scenes from a moving vehicle. In accordance with the disclosure of Finnegan and Durham application Ser. No. 206,120, filed May 5, 1938, successive pictures may be taken of the roadway in the path of a motor vehicle by means of a camera mounted on and travelling with the vehicle, the periodicity of successive exposures being automatically controlled from the operation of the vehicle or otherwise. For example, exposures are made so as to normally give successive overlapping views of the highway in the path of the vehicle, the frequency of exposures being substantially increased when the vehicle is turning, when the brake is applied and/or during other times when the driving conditions deviate from normal straight ahead driving.

One problem which has arisen in connection with the operation of the above-described camera is that of providing for variations in exposure control in accordance with variations in the amount of light available for the exposure. It is desired to divorce the exposure control from any manipulation by the driver of the vehicle or other human agency so that the control of exposures may be rendered entirely automatic and as nearly as possible in conformity with the changes of light conditions throughout the day. Thus it is desired to set the camera on the vehicle to make the successive exposures and to vary the shutter opening or timing automatically in conformity with changes in the amount of light available. For example, on a bright sunny day the timing or shutter openings should be relatively small while same should be increased for a darker day for changes in the amount of light during the day as when the sun is obscured by clouds or when the vehicle itself is driving through a darkened area, such as through wooded country, or is otherwise in the shade.

While it is theoretically possible to make such exposure control by means of a photo-sensitive cell, such as is commonly used in exposure meters, in practice the problem of amplifying the current variations of a photo-sensitive cell are so great as to render any such device impracticable for the intended purpose. The invention provides very simple and mechanically powerful means for providing the desired shutter regulation, said means being automatically responsive to the amount of sunlight available for photographic exposure at any time and in any place occupied by a travelling vehicle throughout the day.

It will be understood that the foregoing general description and the following detailed description as well are exemplary and explanatory of the invention but are not restrictive thereof.

Referring now in detail to the present preferred embodiment of the invention, illustrated by way of example in the accompanying drawing, same is applied to a camera adapted to take successive pictures of outdoor scenes. Said camera is shown diagrammatically in Fig. 1, and comprises a light-tight box or casing in which are mounted in film-feeding reel 2 and a take-up reel 3, the film F being stretched over guidle pulleys 5 and 6 to bring it into position for exposure. It will be understood that the particular construction and arrangement of film feeding and handling means constitute no essential part of the invention and that the showing thereof is largely diagrammatic.

A suitable frame 7, 8 for holding the lens, shutter and other associated elements of the camera is suitably mounted in front of the film F, the lens being in line with a properly shaped light aperture 10 in the forward wall 11 of the camera. While for the broad purposes of the invention the camera may be operated either manually or cinematographically in any known or suitable manner, we have indicated an automatic control for making successive exposures automatically at predetermined intervals. Thus a clock mechanism C is mounted to control a circuit 15 whereby the film F is fed and the lens shutter actuated to make exposures at predetermined successive time intervals. The mechanism for so successively operating the camera from the circuit 15 is not shown but may be the same as or similar to that disclosed in said copending application Ser. No. 206,120, or may be of any other suitable construction wherein the film is fed and the exposures made in successive synchronism. If desired, and in accordance with one application of the invention, the camera may be mounted on a motor vehicle so as to take successive pictures of the roadway in the path of the vehicle, all as disclosed in detail in said copending application.

In accordance with the invention means are provided for varying the intensity of the light admitted to the film through the aperture 10 to the lens in frame 8 and thence to the film F. As embodied, said means preferably comprise devices for varying the position of a neutral filter of variable light density, said filter being interposed in the path of the rays forming the light image. Accordingly, a neutral filter 20 made of suitable photographic filter material and formed as an annular disc is positioned within the front wall 11 of the camera and parallel thereto so that the lowermost portion of the filter ring overlies the lens aperture A, being positioned between same and the light aperture 10. As shown the filter ring 20 is mounted parallel to the inner face of the wall 11 and is keyed to rotate with stub shaft 21 which projects inwardly from said wall above the opening 10.

The filter ring 20 is designed to provide a variation in density or ability to transmit light, varying from complete transparency at the line 22 through 360 degrees to maximum density for exposures to be made from a light image of the highest light intensity to be photographed. Said variation in filter translucency may be effected by progressive change in transparency of the filter material or by progressive variation in the thickness of a filter material of uniform translucency, or by a combination of both factors. As shown, the filter ring or "wedge" 20 is formed of varying thickness and may also vary in transparency of the material. It will be clear therefore, that by varying the angular position of the filter ring 20 with respect to the lens aperture A the intensity of the light rays admitted to the lens and film can be nicely regulated.

In accordance with the invention means are provided for varying the amount of light admitted to the film in inverse ratio to the radiant heat of the light falling on the light image. As shown a thermally expansive bimetal coil 30 is mounted to transmit its thermally responsive movement to rotate and position the filter ring 20 in the desired relation. Said coil 30 shown more or less diagrammatically in Figs. 1 and 3 may be formed of strips of brass and Invar metal or of any other suitable material to give the desired thermo-motive effect. The coil 30 is positioned above the top of the camera 1, one end 31 thereof being held immobile while the free inner end 32 is adapted to transmit its thermally expansive rotational movement to a vertical shaft 34 which extends into the forward portion of the camera and is suitably geared to horizontal shaft 21, whereby the filter ring 20 may be caused to rotate proportionately to the thermo-expansive movement of the coil 30. As required by the invention, the heat affecting the thermo-expansive coil 30 is only the radiant heat emanated by the light falling within the vicinity of the camera and/or the object to be photographed. Accordingly, the coil 30 is encased in a radiation-absorbing casing preferably comprising a double walled black body or bulb 35 which surrounds the coil above the camera and is tightly seated in a horizontal frame or cup 36. The interior of the casing 35, comprising the space about the coil 30, is preferably exhausted to form a substantial vacuum and the space between the walls of the chamber 35 is also exhausted, thereby to shield the coil 30 from any conducted heat created or transmitted other than by the radiant heating effect of the light to which it is exposed.

In operation it will be clear that the radiant heat of the sunlight will cause the coil 30 to expand or contract in direct proportion to the amount of light and thereby effect a corresponding angular movement of the filter ring 20 whereby the amount of light admitted to the film may be varied inversely with the available light so as to regulate the exposure. In lieu of the light filter wedge herein shown and described, other means may be provided for regulating the light transmitted to the film. For example, the movement of the thermo-expansive coil 30 may be applied to vary the lens aperture or the time of lens opening.

In Fig. 4 is shown a modified form of means for controlling the position of the filter ring 20 whereby its position is determined by the differential factor between the normal air temperature and the temperature produced by the radiant heat of the sunlight, thereby to give a corrected factor which may correspond even more closely to the amount of light. As shown, a thermally liquid or gaseous body enclosed in an expansible casing or Sylphon 40 is suitably mounted within an exhausted chamber 41, having a black body exterior, whereby the casing 40 will be subjected solely to the radiant heat of the sunlight in a manner similar to the thermo-expansive coil 30. A similar but smaller Sylphon 42 is mounted below the Sylphon 40 and is exposed to the normal temperature of the air whereby the thermally expansive movement of said Sylphon 42 will be proportional to the air temperature. By suitable linkage, the filter disc 20 may be caused to rotate and position itself proportionately to the difference between the radiant heat expansion of the Sylphon 40 and the air temperature expansion 42. As shown, the upper end of Sylphon 40 is fixed and the lower end is attached to a cable 45 which extends through the wall of the vacuum shell 41 and passes around a pulley 46 which is fixed to the free end of the Sylphon 42. That is, the cable passes around a pulley 47 on the filter ring 20 and is attached at its other end to a spring 48. In operation the movement imparted to the pulley 47 will be the difference between the expansive or contracting movements of the Sylphons 40 and 42.

The invention in its broader aspects is not limited to the specific mechanisms shown and described but departures may be made therefrom within the scope of the accompanying claims without departing from the principles of the invention and without sacrificing its chief advantages.

What we claim is:

1. In a photographic camera in combination a lens to focus an image on a photosensitive surface, means movable with respect to the lens to vary the amount of light passing through the lens to said surface, a thermally-expansive member mounted on the camera, means for exposing said member to the radiant heat of the light being used for the photographic exposure, means for insulating said member from conducted heat, means for transmitting the movement of said thermally-expansive member to move said movable means to thereby vary the transmission of light to the film in inverse proportion to the amount of radiant heat energy in the light.

2. In a photographic camera in combination a lens to focus an image on a photosensitive surface means movable with respect to the lens to vary the amount of light passing through the lens to said surface, a thermally-expansive member mounted on the camera, black-body means for exposing said member to the radiant heat of the light being used for the photographic exposure, means for transmitting the movement of said thermally-expansive member to move said movable means to thereby vary the transmission of light to the film in inverse proportion to the amount of radiant heat energy in the light.

3. In a photographic camera in combination a lens to focus an image on a photosensitive surface, means movable with respect to the lens to vary the amount of light passing through the lens to said surface, a thermally-expansive member mounted on the camera, sensitive to the radiant heat of the light being used for the photographic exposure and immune to conducted heat, means for exposing said member to said light, means for transmitting the movement of said thermally-expansive member to move said movable means to thereby vary the transmission of light to the film in inverse proportion to the amount of radiant heat energy in the light.

4. In a photographic camera in combination a lens to focus an image on a photosensitive surface, a shutter movable with respect to the lens to vary the amount of light passing through the lens to said surface, a thermally-expansive member mounted on the camera, means for exposing said member to the radiant heat of the light being used for the photographic exposure, means for insulating said member from conducted heat, and connections for directly transmitting the movement of said expansive member to the shutter to reduce light to the surface by the expansion of the member.

5. In a photographic camera in combination a lens to focus an image on a photosensitive surface, means movable with respect to the lens to vary the amount of light passing through the lens to said surface, a thermally-expansive member mounted on the camera, means for exposing said member to the radiant heat of the light being used for the photographic exposure, means for insulating said member from conducted heat, means for transmitting the movement of said thermally-expansive member to move said movable means to thereby vary the transmission of light to the film in inverse proportion to the amount of radiant heat energy in the light, and means responsive to normal air temperature for correcting the movement of said expansive member.

GEORGE B. FINNEGAN, Jr.
GEORGE D. CREELMAN.